United States Patent
Buck et al.

(10) Patent No.: US 9,171,124 B2
(45) Date of Patent: Oct. 27, 2015

(54) PARASITIC EXTRACTION IN AN INTEGRATED CIRCUIT WITH MULTI-PATTERNING REQUIREMENTS

(71) Applicant: INTERNATIONAL BUSINESS MACHINES CORPORATION, Armonk, NY (US)

(72) Inventors: Nathan Buck, Underhill, VT (US); Brian Dreibelbis, Underhill, VT (US); John P. Dubuque, Jericho, VT (US); Eric A. Foreman, Fairfax, VT (US); Peter A. Habitz, Hinesburg, VT (US); David J. Hathaway, Underhill, VT (US); Jeffrey G. Hemmett, Bolton Valley, VT (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 0 days.

(21) Appl. No.: 14/139,023

(22) Filed: Dec. 23, 2013

(65) Prior Publication Data
US 2014/0173543 A1    Jun. 19, 2014

Related U.S. Application Data

(62) Division of application No. 13/665,315, filed on Oct. 31, 2012, now Pat. No. 8,769,452.

(51) Int. Cl.
   *G06F 17/50*   (2006.01)
(52) U.S. Cl.
   CPC ........ *G06F 17/5081* (2013.01); *G06F 17/5036* (2013.01); *G06F 2217/82* (2013.01)

(58) Field of Classification Search
   CPC ............ G06F 17/5036; G06F 17/5081; G06F 17/5068; G06F 2217/82; G06F 2217/84; G06F 17/50; G06F 17/5009; G06F 17/5031; G06F 17/505
   USPC .......................... 716/108, 113, 132–136, 139
   See application file for complete search history.

(56) References Cited

U.S. PATENT DOCUMENTS

| 6,880,138 | B1 | 4/2005 | Teig et al. |
| 7,475,377 | B2 * | 1/2009 | Yamada ........................ 716/55 |

(Continued)

OTHER PUBLICATIONS

Notice of Allowance dated Apr. 2, 2014 in related U.S. Appl. No. 13/665,466, 6 pages.

(Continued)

*Primary Examiner* — Nghia Doan
(74) *Attorney, Agent, or Firm* — David Cain; Roberts Mlotkowski Safran & Cole, P.C.

(57) ABSTRACT

Systems and methods are provided for extracting parasitics in a design of an integrated circuit with multi-patterning requirements. The method includes determining resistance solutions and capacitance solutions. The method further includes performing parasitic extraction of the resistance solutions and the capacitance solutions to generate mean values for the resistance solutions and the capacitance solutions. The method further includes capturing a multi-patterning source of variation for each of the resistance solutions and the capacitance solutions during the parasitic extraction. The method further includes determining a sensitivity for each captured source of variation to a respective vector of parameters. The method further includes determining statistical parasitics by multiplying each of the resistance solutions and the capacitance solutions by the determined sensitivity for each respective captured source of variation. The method further includes generating as output the statistical parasitics in at least one of a vector form and a collapsed reduced vector form.

12 Claims, 5 Drawing Sheets

(56) References Cited

U.S. PATENT DOCUMENTS

| | | | |
|---|---|---|---|
| 8,019,458 | B2 | 9/2011 | Funk et al. |
| 8,069,423 | B2 | 11/2011 | Ghan et al. |
| 8,180,621 | B2 * | 5/2012 | Phillips .......................... 703/14 |
| 8,239,798 | B1 | 8/2012 | Goyal et al. |
| 2004/0058255 | A1 | 3/2004 | Jessen et al. |
| 2011/0139982 | A1 | 6/2011 | Kijima et al. |
| 2012/0035878 | A1 | 2/2012 | Phatak |
| 2013/0094035 | A1 | 4/2013 | Chang et al. |

OTHER PUBLICATIONS

Notice of Allowance dated Feb. 20, 2014 in related U.S. Appl. No. 13/665,315, 6 pages.

Office Action dated Jan. 22, 2014 in related U.S. Appl. No. 13/665,276, 9 pages.

Jeong et al., Assessing Chip-Level Impact of Double Patterning Lithography, 2010, IEEE, pp. 122-130.

Jeong et al., A Framework for Chip-Level Evaluation of Misalignment and Linewidth Error Impacts Across Double-Patterning Technology Otion, 2010, pp. 1-8.

Ausschnitt, C.P., "Multi-Patterning Overlay Control", SPIE Digital Library vol. 6924, 2008, 5 pages.

Unknown, "Comprehensive Multi-Patterning Support: Calibre Multi-Patterning" www.mentor.com, 2011, 3 pages.

Englard et al., "Accurate In-Resolution Level Overlay Metrology for Multi-Patterning Lithography Techniques", SPIE Digital Library vol. 6922, 2008, 9 pages.

Jeong et al., "Timing Analysis and Optimization Implications of Bimodal CD Distribution in Double Patterning Lithography", IEEE, 2009, pp. 486-491.

Poutous et al., "Correlation of Fabrication Tolerances with the Performance of Guided_Mode-Resonance Micro-optical Components", Proc. of SPIE vol. 7205, 2009, 9 pages.

Kahng, "The Future of Signoff", TAU 2011 Keynote, UCSD VLSI CAD Laboratory, 2011, 52 pages.

Notice of Allowance dated May 27, 2014 in related U.S. Appl. No. 13/665,276, 8 pages.

Notice of Allowance dated Sep. 22, 2014 in related U.S. Appl. No. 14/139,004, 10 pages.

* cited by examiner

PARASITIC EXTRACTION IN AN INTEGRATED CIRCUIT WITH MULTI-PATTERNING REQUIREMENTS

FIELD OF THE INVENTION

The invention relates to systems and methods for integrated circuit ("IC") fabrication and optimization and, more particularly, to systems and methods for extracting parasitics in a design of integrated circuits with multi-patterning requirements.

BACKGROUND

An IC is a device (e.g., a semiconductor device) or electronic system that includes many electronic components, such as transistors, resistors, diodes, etc. These components are often interconnected to form multiple circuit components, such as gates, cells, memory units, arithmetic units, controllers, decoders, etc. An IC includes multiple layers of wiring that interconnect its electronic and circuit components.

Design engineers design ICs by transforming logical or circuit descriptions of the ICs' components into geometric descriptions, called design layouts. IC design layouts typically include circuit modules (e.g., geometric representations of electronic or circuit IC components) with pins, and interconnect lines (e.g., geometric representations of wiring) that connect the pins of the circuit modules. A net is typically defined as a collection of pins that need to be connected. In this fashion, design layouts often describe the behavioral, architectural, functional, and structural attributes of the IC. To create the design layouts, design engineers typically use electronic design automation ("EDA") applications. These applications provide sets of computer-based tools for creating, editing, analyzing, and verifying design layouts.

A process traditionally performed in the design of the IC is called parasitic extraction. Parasitic extraction is the calculation of parasitic effects (e.g., parasitic capacitances, parasitic resistances and parasitic inductances) in both the designed electronic components and the required wiring interconnects of the IC. The purpose of the parasitic extraction is to create an accurate analog model of the circuit, such that detailed simulations can emulate actual digital and analog circuit responses. Digital circuit responses are often used to populate databases for signal delay and loading calculation such as timing analysis, circuit simulation, and signal integrity analysis. Analog circuits are often run in detailed test benches to indicate if the extracted parasitics may allow the designed IC to function within predetermined specifications.

The manufacturing requirements at advanced process nodes, such as multi-patterning lithography at 0.02 μm, are advancing newer parasitic modeling techniques to achieve signoff accuracy and performance. Multi-patterning lithography is an important technique for ensuring printability of device and interconnect layers in advanced process node manufacturing. However, splitting layers into multiple masks can introduce timing variations because of mask misalignment in the manufacturing process. For example, the misalignment of the layout masks may cause variations in coupling capacitances between the polygons that are on different masks, which in turn affects both the couplings and the total capacitances of the nets.

Errors introduced into the parasitic extraction by multi-patterning depend on mask displacement amount. Impact on coupling capacitance can be large, even while it is smaller on total capacitance, due to the different impact on coupling capacitances at the opposite sides of conductor segments. To enable successful advanced process node manufacturing, a multi-patterning aware modeling solution for parasitic extraction is needed to account for the timing impact and to address the multi-patterning in the physical implementation and signoff design flow.

Accordingly, there exists a need in the art to overcome the deficiencies and limitations described hereinabove.

SUMMARY

In a first aspect of the invention, a method of parasitic extraction is provided for multi-patterning in an integrated circuit design. The method includes determining resistance solutions and capacitance solutions for a netlist of the integrated circuit design using a processor. The method further includes performing parasitic extraction of the resistance solutions and the capacitance solutions to generate mean values for the resistance solutions and the capacitance solutions. The method further includes capturing a multi-patterning source of variation for each of the resistance solutions and the capacitance solutions during the parasitic extraction. The method further includes determining a sensitivity for each captured source of variation to a respective vector of parameters. The method further includes determining statistical parasitics by multiplying each of the resistance solutions and the capacitance solutions by the determined sensitivity for each respective captured source of variation. The method further includes generating as output the statistical parasitics in at least one of a vector form and a collapsed reduced vector form.

In another aspect of the invention, a method of parasitic extraction is provided for multi-patterning in an integrated circuit design. The method includes determining resistance solutions and capacitance solutions for a netlist of the integrated circuit design using a processor. The method further includes performing a first parasitic extraction of the resistance solutions and the capacitance solutions to generate a first set of parasitic values comprising mean values for the resistance solutions and the capacitance solutions. The method further includes modifying at least one geometrical value to a new value for each vector of parameters identified within the integrated circuit design based on a shift in value attributable to multi-patterning for a given layer of the integrated circuit design. The method further includes performing a second parasitic extraction of the resistance solution and the capacitance solution based on the modified at least one geometrical value, to generate a second set of parasitic values. The method further includes determining a difference between the first set of parasitic values and the second set of parasitic values to generate sensitivities. The method further includes generating as output statistical parasitics in at least one of a vector form and a collapsed reduced vector form using a processor.

In yet another aspect of the invention, a computer program product is provided comprising a computer readable storage medium having readable program code embodied in the storage medium. The computer program product includes at least one component operable to determine resistance solutions and capacitance solutions for a netlist of an integrated circuit design. The at least one component is further operable to perform a first parasitic extraction of the resistance solutions and the capacitance solutions to generate a first set of parasitic values comprising mean values for the resistance solutions and the capacitance solutions. The at least one component is further operable to identify a separate parameter for each pattern or color of multi-patterning for a given layer of the integrated circuit design, wherein the parameter for each pattern or color of the multi-patterning is a vector of parameters. The at least one component is further operable to modify at least one geometrical value to a new value for each vector of parameters identified within the integrated circuit design based on a shift in value attributable to the multi-patterning for the given layer of the integrated circuit design. The at least one component is further operable to perform a second parasitic extraction of the resistance solution and the capacitance solution based on the modified at least one geometrical value, to generate a second set of parasitic values. The at least one component is further operable to determine a difference between the first set of parasitic values and the second set of parasitic values to generate sensitivities. The at least one component is further operable to generate as output statistical parasitics in at least one of a vector form and a collapsed reduced vector form.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

Figure 1:
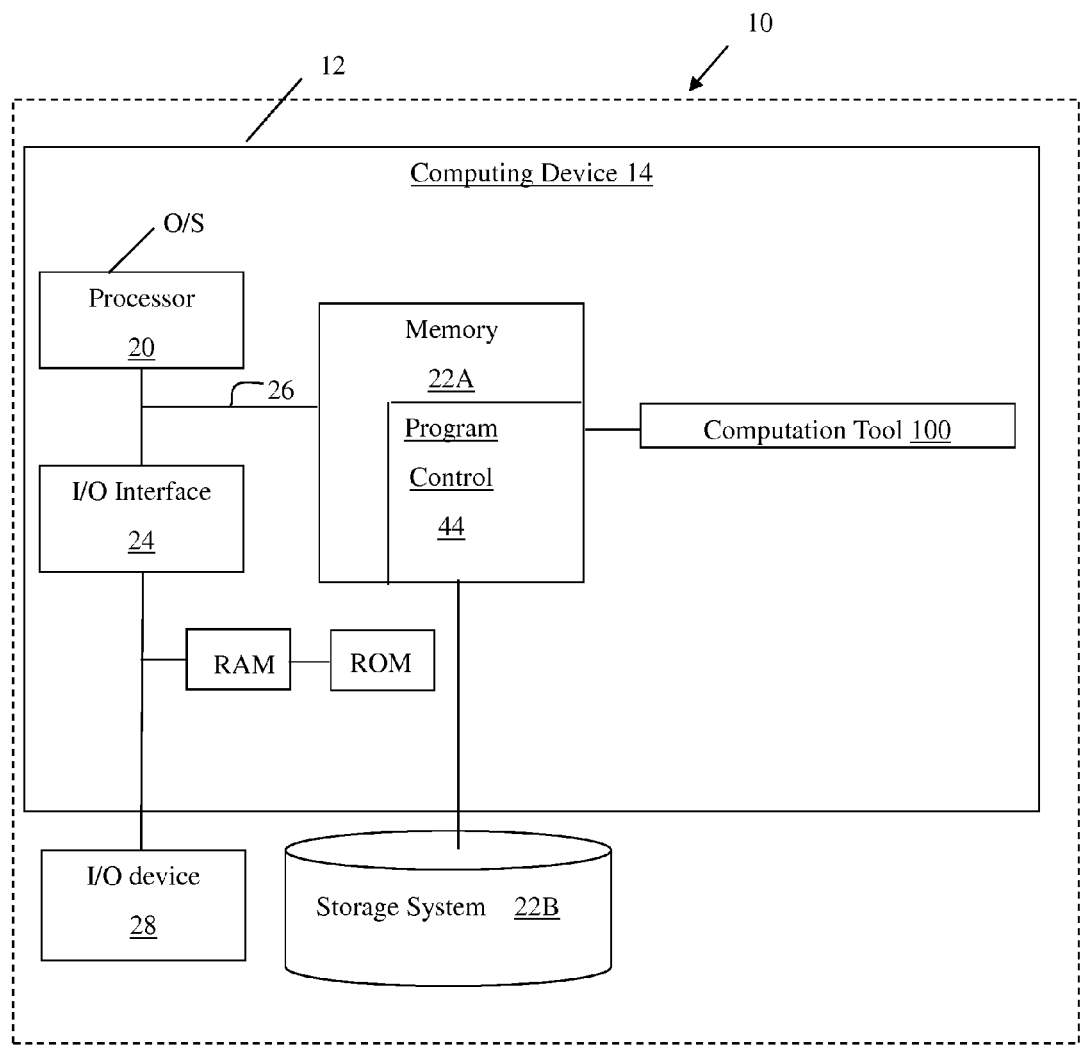
FIG. 1 is an illustrative external environment for implementing the invention in accordance with aspects of the invention.

The invention relates to systems and methods for extracting parasitics in a design of ICs with multi-patterning requirements. More specifically, implementations of the invention provide systems and methods for modeling multi-patterning (or color) aware parasitics to account for the timing impact and to address the multi-patterning in the physical implementation and signoff design flow. In some embodiments, it is possible to capture multi-patterning sources of variation for each of the resistance solutions and the capacitance solutions during the parasitic extraction. In additional or alternative embodiments, it is possible to modify at least one geometrical value to a new value for each vector of parameters identified within the IC design based on a shift in value attributable to multi-patterning for a given layer of the IC design. Advantageously, the systems and methods of the present invention allow for simple models of the statistical color aware parasitics in a vector form or a collapsed reduced vector form.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM),an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with an external I/O device/resource 28 and a storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a computation tool 100, e.g., at least a portion of an EDA application, which performs the processes described herein. The computation tool 100 can be implemented as one or more program code in the program control 44 stored in memory 22A as separate or combined modules. Additionally, the computation tool 100 may be implemented as separate dedicated processors or a single or several processors to provide the function of these tools.

In embodiments, the computation tool 100 may be configured to determine resistance solutions and capacitance solutions for a netlist of an IC design. The computation tool 100 may further be configured to perform parasitic extraction of the resistance solutions and the capacitance solutions. In some embodiments, the computation tool 100 may then be configured to determine statistical parasitics by multiplying each of the resistance solutions and the capacitance solutions by determined sensitivities for each respective captured source of variation model, and model the statistical parasitics in a vector form or a collapsed reduced vector form.

In additional or alternative embodiments, the computation tool 100 may be configured to performing a first parasitic extraction and a second parasitic extraction of the resistance solutions and the capacitance solutions. The second parasitic extraction may be based on a modified at least one geometrical value. The computation tool 100 may then be configured to determine a difference between the first parasitic extraction and the second parasitic extraction to generate sensitivities, and model statistical parasitics in a vector form or a collapsed form.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagram

Figure 2:
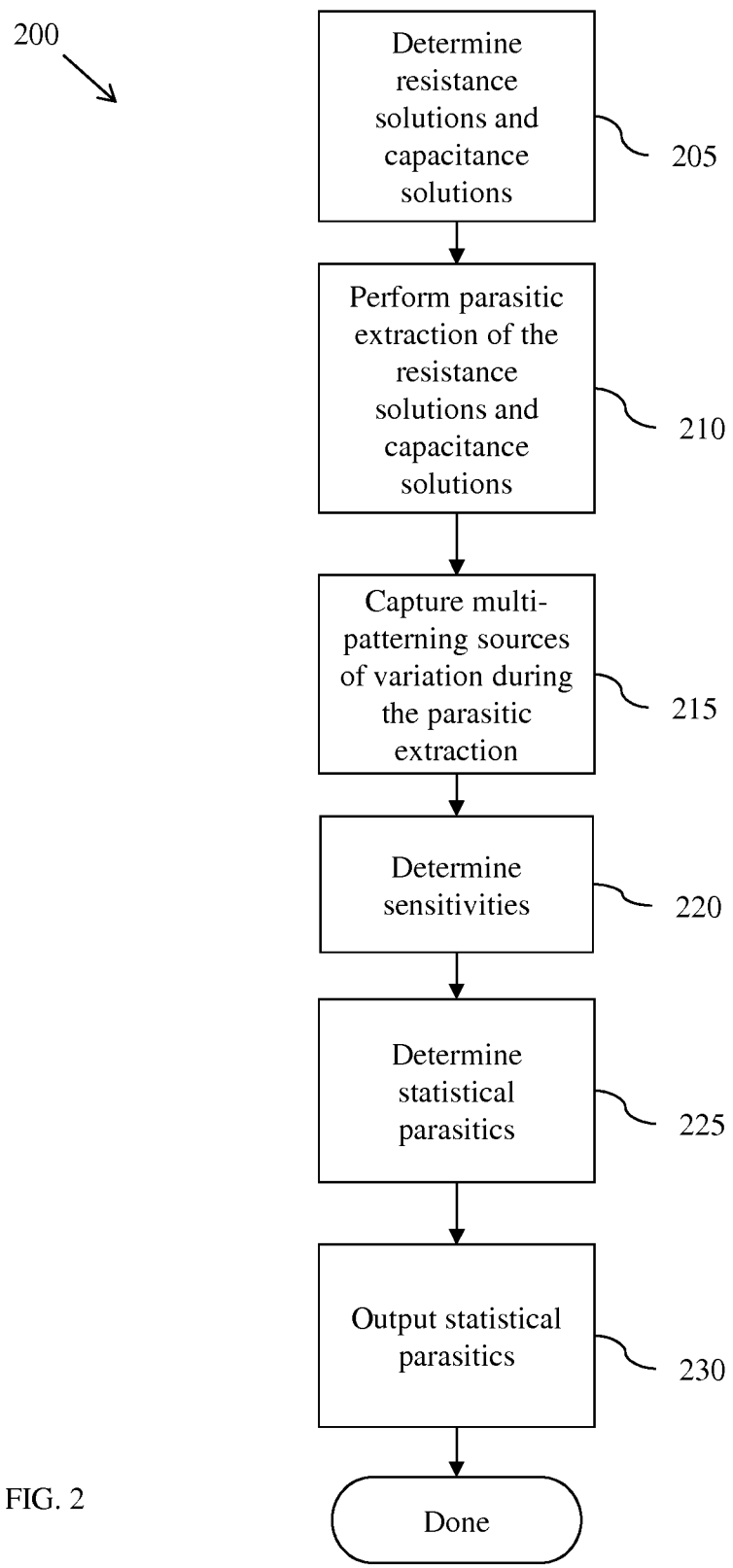
FIGS. 2-4 are illustrative process flows for implementing the system in accordance with aspects of the invention.
Figure 3:
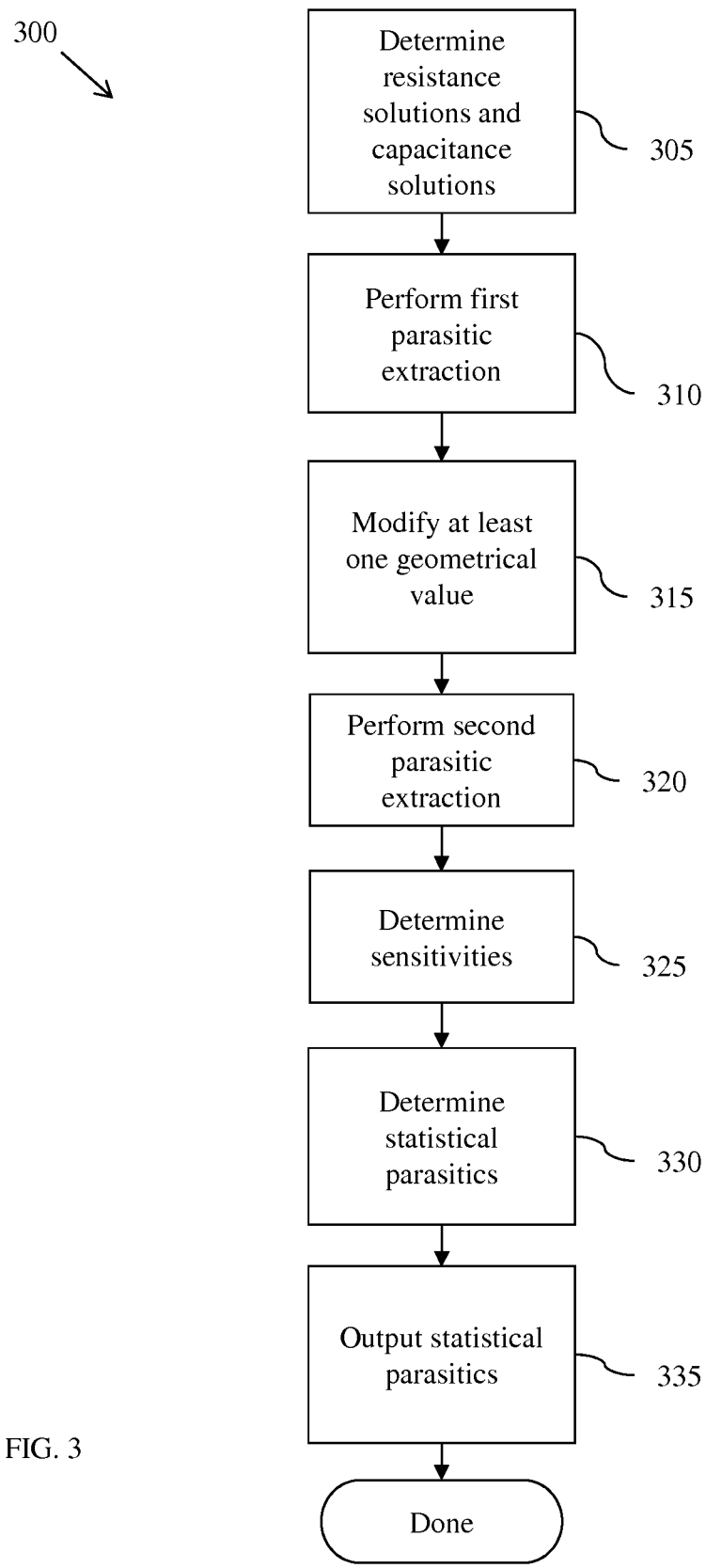
Figure 4:
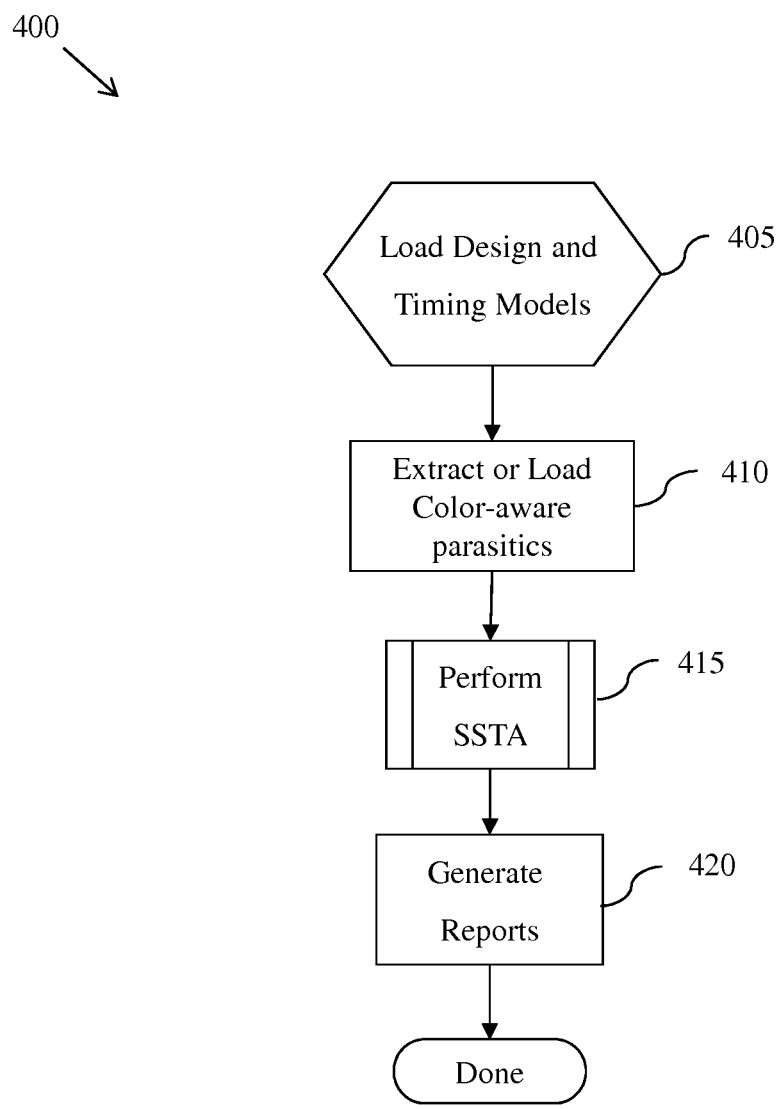

FIGS. 2-4 show exemplary flows for performing aspects of the present invention. The steps of FIGS. 2-4 may be implemented in the environment of FIG. 1, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

In embodiments, as shown in FIG. 2, a process 200 is provided for parasitic extraction for multi-patterning in an IC design. At step 205, resistance solutions and capacitance solutions are determined for a netlist of the IC design, as discussed in further detail below with respect to the capacitance solution and resistance solution tables. The design may be composed of a gate level net list or a text (or binary) based description of all electronic components and interconnects on a chip. The resistance solutions and the capacitance solutions may be computed for each segment of the net list. In additional or alternative embodiments, +/−n sigma (e.g., +/−3 sigma) resistance solutions and capacitance solutions may also be computed for each segment of the net list, as discussed in further detail below with respect to the capacitance solution and resistance solution tables0.

To account for the different electronic components and interconnects during the design, capacitance solution and resistance solution tables may be generated for each pattern or color. The capacitance solution and resistance solution tables may be generated using two- or three-dimensional field solvers for various combinations of width and spacing to neighbors per each metal or wiring layer. Due to the different metal density and patterns, each pattern or color can have different process variation, so that widths and heights vary based on the context of patterns or colors. Therefore, variational capacitance solution tables may be required. For example, best case, nominal case, and worst case corners for each capacitance solution and/or resistance solution between electronic components and interconnects pairs may be generated using statistical variation information from the semiconductor foundry per each width-height combination.

At step 210, parasitic extraction of the resistance solutions and the capacitance solutions is performed. In embodiments, the parasitic extraction is performed to generate mean values for the resistance solutions and the capacitance solutions. In some embodiments, the parasitic extraction includes the calculation of parasitic effects (e.g., parasitic capacitances and parasitic resistances) in both the designed electronic components and/or the required wiring interconnects of the IC design, as would be understood by one of ordinary skill in the art.

At step 215, multi-patterning sources of variation are captured for each of the resistance solutions and the capacitance solutions during the parasitic extraction. In embodiments, the multi-patterning variability may be captured by defining a separate parameter for each pattern. In accordance with aspects of the invention, the parameter (e.g., a value that is in some way controlled, provided in advance, or kept constant within the IC design) defined for each pattern or photomask, which could also be a vector of parameters (e.g., a set of parameters that form a vector), may include width, registration, rotation, etc. For example, width of a pattern may be defined as a source of variation in the IC design.

In additional embodiments, parameters may be combined and collapsed. For example: (i) registration and rotation could be combined as a displacement parameter, (ii) parameters may be collapsed for local paths, (iii) registrations at the top of long paths could be defined as different parameters, and/or (iv) rotation (e.g., rotation with up to an including four degrees of freedom may be provided) and the center of the rotation may be defined as parameters.

Furthermore, capacitance of wiring layers could be expressed as a function of both a first parameter for a first pattern (first color) and a second parameter for a second pattern (second color), depending on whether the wiring layers are in close proximity to other patterns. The wiring layers in the middle of the IC design may have less affect on a specified pattern than wiring layers on the outside of the IC design. Additionally, the parameters could be defined to have higher order sensitivities, e.g., the capacitance may not linearly relate to other patterns around a specified patterns.

In addition, relative spatial relationships could be defined for parameter reduction. For example, a parameter could be defined based on a first pattern shift relative to a second pattern, rather than a first and second pattern shift relative to some fixed point. In embodiments, some parameters may be collapsed (e.g., two registration parameters for a double pattern could be collapsed to one). However, generally the parameters should not be collapsed, particularly, when there are more than two patterns.

At step 220, sensitivities are determined. In embodiments, the sensitivities for each captured source of variation to a respective vector of parameters may be determined. For example, most statistical analysis solutions use a sensitivity-based approach to model the effect of variation on timing. This involves establishing how change in a particular device or interconnect parameter affects a desired property of the integrated circuit. This sensitivity to the parameter, in conjunction with its probability distribution (mean and standard deviation), provides a statistical model describing the probability that a parameter will have a certain effect on a device or interconnect property. In some embodiments, the sensitivities are determined from one pattern or color to another pattern or color for each of the resistance solutions and the capacitance solutions.

At step 225, statistical parasitics are determined. In some embodiments, statistical parasitics are determined by multiplying each of the resistance solutions and the capacitance solutions by the determined sensitivity for each respective captured source of variation. At step 230, the statistical parasitics are output or modeled in a vector form and/or a collapsed reduced vector form. Advantageously, this process allows for simple models of the statistical color aware parasitics in a vector form and/or a collapsed reduced vector form.

In embodiments, as shown in FIG. 3, a process 300 is provided for parasitic extraction for multi-patterning in an IC design. At step 305, resistance solutions and capacitance solutions are determined for a netlist of the IC design, as described above with respect to process 200.

At step 310, a parasitic extraction of the resistance solutions and the capacitance solutions is performed. In embodiments, a first parasitic extraction of the resistance solutions and the capacitance solutions is performed to generate a first set of parasitic values comprising mean values for the resistance solutions and the capacitance solutions. In some embodiments, the parasitic extraction may include the calculation of parasitic effects (e.g., parasitic capacitances and parasitic resistances) in both the designed electronic components and/or the required wiring interconnects of the IC design, as would be understood by one of ordinary skill in the art.

At step 315, at least one geometrical value is modified to a new value for each vector of parameters identified within the IC design. In embodiments, the at least one geometrical value is modified to the new value for each vector of the parameters identified within the IC design based on a shift in value attributable to multi-patterning for a given layer of the IC design. In accordance with aspects of the invention, the parameter (e.g., a value that is in some way controlled, provided in advance, or kept constant within the IC design) defined for each pattern or photomask, which could also be a vector of parameters (e.g., a set of parameters that form a vector), may include width, registration, rotation, etc. For example, width of a pattern may be defined as a source of variation in the IC design.

At step 320, a second parasitic extraction of the resistance solutions and the capacitance solutions is performed. In embodiments, the second parasitic extraction of the resistance solutions and the capacitance solutions is performed based on the modified at least one geometrical value to generate a second set of parasitic values relative to the modified at least one geometrical value.

At step 325, a difference between the first set of parasitic values and the second set of parasitic values is calculated. In embodiments, a difference between the first set of parasitic values and the second set of parasitic values are determined to generate sensitivities. For example, the sensitivities for each captured source of variation to a respective vector of parameters may be determined based on the difference between the first set of parasitic values and the second set of parasitic values. In some embodiments, the sensitivities are determined from one pattern or color to another pattern or color based on the shift in value attributable to the multi-patterning.

At step 330, statistical parasitics are determined. In some embodiments, statistical parasitics are determined by multiplying each of the resistance solutions and the capacitance solutions by the determined sensitivities. At step 335, the statistical parasitics are output or modeled in a vector form and/or a collapsed reduced vector form. Advantageously, this process allows for simple models of the statistical color aware parasitics in a vector form and/or a collapsed reduced vector form.

In embodiments, as shown in FIG. 4, a process 400 is provided for generating a design layout of an integrated circuit. At step 405, a netlist for the integrated circuit may be loaded. For example, a design layout and timing models for at least one circuit path of an IC or a specified region of the IC may be loaded into the computation tool 100 (as discussed with respect to FIG. 1). The design and timing models for the IC may be found or provided by a designer of the IC.

At step 410, color-aware parasitics for the IC may be provided in accordance with either process 200 or 300, as discussed in detail above. For example, a parasitic technology file for the IC design may be loaded into the computation tool 100 (as discussed with respect to FIG. 1). The parasitic technology file may be generated such that the file comprises all process technology parameters that describe electrical behavior for regions of the IC chip. In embodiments, the parasitic technology file may be generated as a color-aware or pattern-aware parasitic file such that the parasitic technology file may include multi-patterning sources of variation for each resistance solution and capacitance solution captured during the parasitic extraction, as described above in accordance with process 200 or 300.

At step 415, a statistical static timing analysis (SSTA) of the IC may be performed using at least the color-aware parasitics. In embodiments, the SSTA may be computed for the netlist of at least one circuit path of the IC or a specified region of IC. In accordance with aspects of the invention, the SSTA may be computed to model the effect of possible multi-patterning variation in the IC or the specified region of the IC on the timing of the at least one circuit path. This may include establishing how multi-patterning variation in a particular device, such as pattern width, affects a desired property of the IC, such as slew or capacitance of the IC. It is possible to subsequently use the parameter variation information for a timing analysis by generating the above-described parasitic extraction, which takes into consideration sensitivities to these parameters. For the IC or the specified region of the IC, these sensitivities represent how the change in a particular parameter affects delay, slew, setup, hold, resistance, capacitance, etc with respect to parasitics.

Once the color-aware parasitics are generated, an SSTA engine, e.g., computation tool 100 (as described above with respect to FIG. 1), can then compute all arrival times (ATs), required arrival times (RATs), and slacks for nodes of the IC or the specified region of the IC. At step 420, reports may be generated. For example, the computation tool 100 may generate reports comprising any timing quantity including the RATs, the ATs, the slack projection, and the transition time or slew rate for the design structure obtained from the SSTA.

Figure 5:
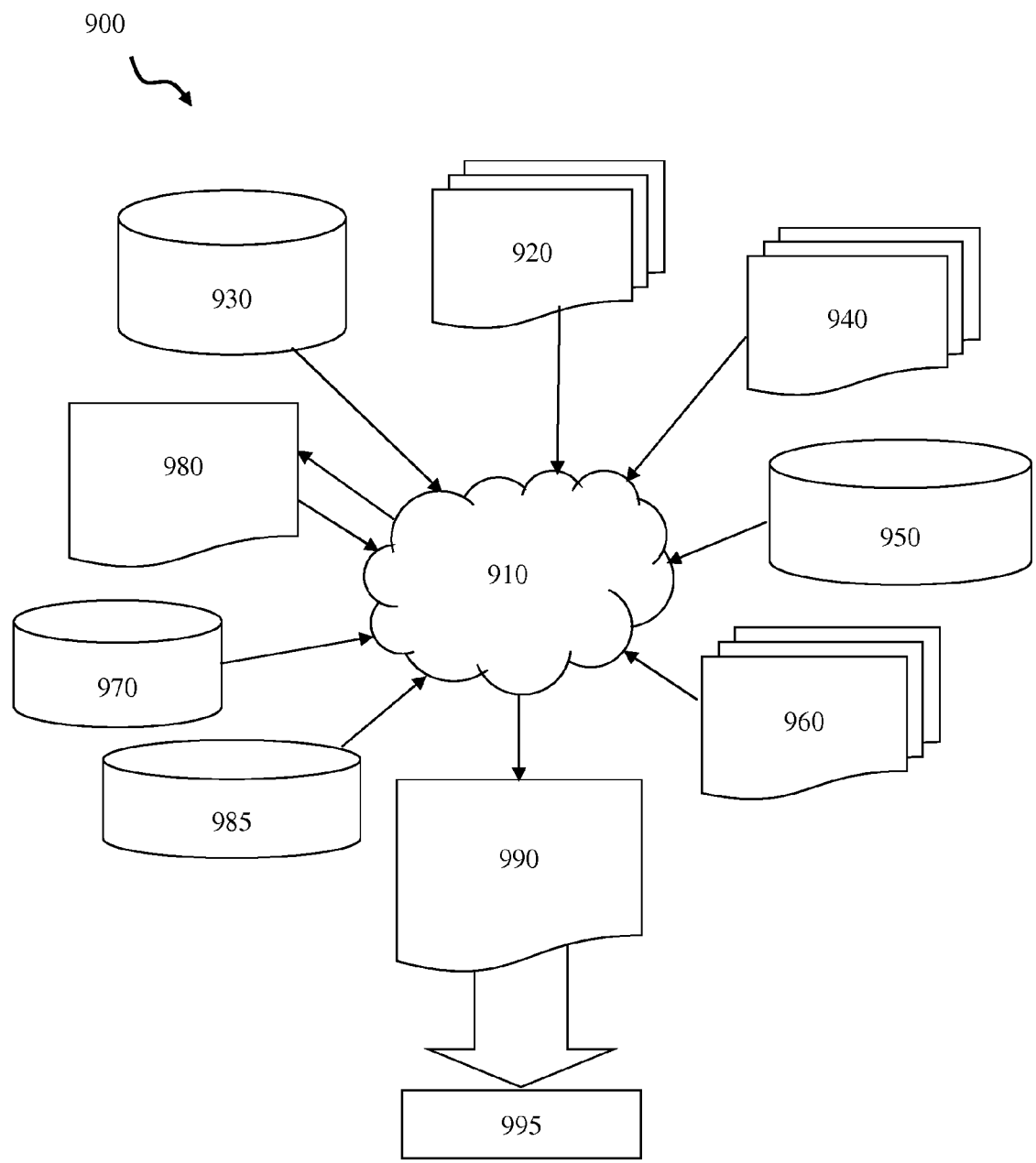
FIG. 5 is a flow diagram of a design process used in semiconductor design, manufacture, and/or test.

FIG. 5 is a flow diagram of a design process used in semiconductor design, manufacture, and/or test used with the system and method of the present invention. FIG. 5 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 that may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of parasitic extraction for multi-patterning in an integrated circuit design, the method comprising:
    determining resistance solutions and capacitance solutions for a netlist of the integrated circuit design using a processor;
    performing a first parasitic extraction of the resistance solutions and the capacitance solutions to generate a first set of parasitic values comprising mean values for the resistance solutions and the capacitance solutions;
    modifying at least one geometrical value to a new value for each vector of parameters identified within the integrated circuit design based on a shift in value attributable to multi-patterning for a given layer of the integrated circuit design;
    performing a second parasitic extraction of the resistance solution and the capacitance solution based on the modified at least one geometrical value, to generate a second set of parasitic values;
    determining a difference between the first set of parasitic values and the second set of parasitic values to generate sensitivities for each captured source of variation to a respective vector of parameters based on the shift in the value attributable to the multi-patterning; and
    generating as output statistical parasitics in at least one of a vector form and a collapsed reduced vector form, wherein the statistical parasitics are determined by multiplying each of the resistance solutions and the capacitance solutions by the generated sensitivities,
    wherein the integrated circuit design is configured to be implemented to manufacture integrated circuit devices with a multi-pattern process.

2. The method of claim 1, wherein the netlist comprises all electronic components and interconnects of the integrated circuit design.

3. The method of claim 2, wherein the resistance solutions and the capacitance solutions are determined for each segment of the net list.

4. The method of claim 3, wherein +/− n sigma resistance solutions and capacitance solutions are computed for each segment of the net list.

5. The method of claim 4, further comprising generating capacitance solution and resistance solution tables for each pattern or color of the multi-patterning.

6. The method of claim 5, wherein the capacitance solution and resistance solution tables are generated using two- or three-dimensional field solvers for various combinations of width and spacing to neighboring electronic components and interconnects per each metal or wiring layer.

7. The method of claim 6, further comprising identifying a separate parameter for each pattern or color of the multi-patterning, wherein the parameter for each pattern or color of the multi-patterning is the vector of parameters.

8. The method of claim 7, wherein the sensitivities are determined from one pattern or color to another pattern or color for each of the resistance solutions and the capacitance solutions.

9. The method of claim 1, further comprising generating a design layout of the integrated circuit using the output statistical parasitics, the generating the design layout comprising:
    loading the netlist of the integrated circuit;
    performing a statistical static timing analysis (SSTA) of the integrated circuit using the output statistical parasitics; and
    determining timing of the integrated circuit.

10. A computer program product comprising a computer readable storage medium having readable program code embodied in the storage medium, the computer program product includes at least one component operable to:
    determine resistance solutions and capacitance solutions for a netlist of an integrated circuit design;
    perform a first parasitic extraction of the resistance solutions and the capacitance solutions to generate a first set of parasitic values comprising mean values for the resistance solutions and the capacitance solutions;
    identify a separate parameter for each pattern or color of multi-patterning for a given layer of the integrated circuit design, wherein the parameter for each pattern or color of the multi-patterning is a vector of parameters;
    modify at least one geometrical value to a new value for each vector of parameters identified within the integrated circuit design based on a shift in value attributable to the multi-patterning for the given layer of the integrated circuit design;
    perform a second parasitic extraction of the resistance solution and the capacitance solution based on the modified at least one geometrical value, to generate a second set of parasitic values;
    determine a difference between the first set of parasitic values and the second set of parasitic values to generate sensitivities for each captured source of variation to a respective vector of parameters based on the shift in the value attributable to the multi-patterning; and
    generate as output statistical parasitics in at least one of a vector form and a collapsed reduced vector form, wherein the statistical parasitics are determined by multiplying each of the resistance solutions and the capacitance solutions by the generated sensitivities,
    wherein the integrated circuit design is configured to be implemented to manufacture integrated circuit devices with a multi-pattern process.

11. The computer program product of claim 10, wherein:
    the netlist comprises all electronic components and interconnects of the integrated circuit design; and
    the resistance solutions and the capacitance solutions are determined for each segment of the net list.

12. The computer program product of claim 11, wherein:
    the at least one component is further operable to generate capacitance solution and resistance solution tables for each pattern or color of the multi-patterning;
    +/− n sigma resistance solutions and capacitance solutions are computed for each segment of the net list; and
    the capacitance solution and resistance solution tables are generated using two- or three-dimensional field solvers for various combinations of width and spacing to neighboring electronic components and interconnects per each metal or wiring layer.

* * * * *